United States Patent
Martin

(10) Patent No.: US 10,743,230 B2
(45) Date of Patent: Aug. 11, 2020

(54) NODE RESELECTION DETERMINED BY THE NETWORK ON RECEIVED UE BEACON SIGNALING

(71) Applicant: SONY CORPORATION, Tokyo (JP)

(72) Inventor: Brian Alexander Martin, Basingstoke (GB)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/571,209

(22) PCT Filed: Jun. 10, 2016

(86) PCT No.: PCT/EP2016/063378
§ 371 (c)(1),
(2) Date: Nov. 1, 2017

(87) PCT Pub. No.: WO2016/206998
PCT Pub. Date: Dec. 29, 2016

(65) Prior Publication Data
US 2018/0270730 A1    Sep. 20, 2018

(30) Foreign Application Priority Data
Jun. 24, 2015   (EP) .................................... 15173562

(51) Int. Cl.
*H04W 72/04*        (2009.01)
*H04W 36/30*        (2009.01)
(Continued)

(52) U.S. Cl.
CPC ........... *H04W 36/30* (2013.01); *H04W 24/10* (2013.01); *H04W 36/0027* (2013.01);
(Continued)

(58) Field of Classification Search
CPC ............. H04W 36/30; H04W 36/0088; H04W 36/0027; H04W 36/0083; H04W 36/38; H04W 24/10
See application file for complete search history.

(56) References Cited

U.S. PATENT DOCUMENTS 8,548,376 B2 * 10/2013 Park ....................... H04B 7/155
455/7
2010/0056170 A1    3/2010 Lindoff et al.
(Continued)

FOREIGN PATENT DOCUMENTS

GB         2493183 A       1/2013
WO      2011/094644 A1     8/2011
(Continued)

OTHER PUBLICATIONS

Harri Holma, et al., "LTE for UMTS—OFDMA and SC-FDMA Based Radio Access," John Wiley and Sons, 2009, (4 pages).
(Continued)

*Primary Examiner* — Hassan Kizou
*Assistant Examiner* — Mahbubul Bar Chowdhury
(74) *Attorney, Agent, or Firm* — Xsensus LLP

(57) ABSTRACT

A wireless telecommunications system including: a controller; a first base station and a second base station; and a terminal device operable to communicate with the first base station over a first radio path and to communicate with the second base station over a second radio path. The controller is configured to select one of the first base station and the second base station to act as a serving base station for the terminal device based on measurements of beacon signalling transmitted by the terminal device, wherein the measurements provide an indication of radio channel conditions associated with the first radio path and the second radio path.

11 Claims, 8 Drawing Sheets

(51) Int. Cl.
*H04W 24/10* (2009.01)
*H04W 36/00* (2009.01)
*H04W 36/38* (2009.01)

(52) U.S. Cl.
CPC ... *H04W 36/0083* (2013.01); *H04W 36/0088* (2013.01); *H04W 36/38* (2013.01)

(56) References Cited

U.S. PATENT DOCUMENTS

| | | | |
|---|---|---|---|
| 2011/0305190 A1* | 12/2011 | Seki | H04B 7/155 370/315 |
| 2012/0028627 A1 | 2/2012 | Hunzinger | |
| 2012/0129566 A1 | 5/2012 | Lee et al. | |
| 2013/0029707 A1* | 1/2013 | Virta | H04B 17/309 455/507 |
| 2014/0031043 A1 | 1/2014 | Holma et al. | |
| 2014/0171062 A1* | 6/2014 | Fallgren | H04W 40/22 455/422.1 |
| 2014/0256328 A1* | 9/2014 | Li | H04L 5/0051 455/444 |
| 2015/0078216 A1 | 3/2015 | Ribeiro et al. | |
| 2016/0227518 A1* | 8/2016 | Li | H04W 72/042 |
| 2017/0251507 A1* | 8/2017 | Fodor | H04W 76/14 |

FOREIGN PATENT DOCUMENTS

| | | |
|---|---|---|
| WO | 2012/139626 A1 | 10/2012 |
| WO | 2013/167807 A1 | 11/2013 |
| WO | 2016/128213 A1 | 8/2016 |

OTHER PUBLICATIONS

"4G Americas' Recommendations on 5G Requirements and Solutions," White Paper by 4G Americas, http://www.4gamericas.org/files/2714/1471/2645/4G_Americas_Recommendations_on_5G_Requirements_and_Solutions_1_0_14_2014-FINALx.pdf, Oct. 2014, (40 pages).

"Ericsson Mobility Report on the Pulse of the Networked Society," http://www.ericsson.com/res/docs/2014/ericsson-mobility-report-november-2014.pdf, Nov. 2014, (32 pages).

International Search Report dated Sep. 30, 2016 in PCT/EP2016/063378 filed Jun. 10, 2016.

European Communication Pursuant to Article 94(3) dated Jun. 3, 2020 in European Application No. 16 732 523.2.

* cited by examiner

NODE RESELECTION DETERMINED BY THE NETWORK ON RECEIVED UE BEACON SIGNALING

CROSS-REFERENCE TO RELATED APPLICATIONS

The present application is based on PCT filing PCT/EP2016/063378 filed Jun. 10, 2016, and claims priority to European Patent Application 15 173 562.8, filed in the European Patent Office on Jun. 24, 2015, the entire contents of each of which being incorporated herein by reference.

TECHNICAL FIELD OF THE DISCLOSURE

The present disclosure relates to a system, a terminal device, a base station, a controller element and methods.

BACKGROUND OF THE DISCLOSURE

With current mobile telecommunications systems, such as those based on the 3GPP defined UMTS and Long Term Evolution (LTE) architecture, network node selection, reselection and handover is carried out on the basis of measurements of downlink signals broadcast by each of the network nodes. These measurements are performed by terminal devices (also known as user equipment or UEs), and network node selection, reselection or handover is then performed on the basis of these measurements so as to allow each UE to communicate with the network. Each network node may be, for example, a base station or a relay node.

The performance of such measurements (together with the associated measurement report signalling, handover signalling, reselection evaluation, etc.), however, results in high power consumption by the UE and requires the UE to comprise relatively complex and costly equipment for performing such measurements (which must be made over a range of different radio frequencies). This results in lower UE battery life, and also makes it difficult to design lower cost, simple UEs that are able to effectively communicate with a telecommunications network. In addition, these procedures require a significant amount of overhead in terms of control signalling between the UE and the network. For example, during handover several messages must be exchanged between the UE and the network before a handover can be considered complete (at least a measurement control, measurement report, handover, handover complete). This overhead associated with handover not only increases the signalling load in the network, but it also increases the probability of handover failure, particularly in the case of small cells and/or fast moving UEs, because of the time taken to perform the measurements and signalling.

Furthermore, in order to track the UE's location in idle mode, the UE must perform a location or tracking area update when moving to a different area of the network, and the network must page via all possible cells in the location or tracking area—this is a compromise between increased signalling due to frequent location/tracking area updates (e.g. if this was required on every cell change) and paging load within a location/tracking area to reach the UE whose location is not known at per-cell level, but only per location/tracking area.

The present invention aims to alleviate these problems.

SUMMARY OF THE DISCLOSURE

According to a first aspect of the present disclosure, there is provide a wireless telecommunications system comprising: a controller element; a first base station and a second base station; and a terminal device operable to communicate with the first base station over a first radio path and to communicate with the second base station over a second radio path; wherein the controller element is configured to select one of the first base station and the second base station to act as a serving base station for the terminal device on the basis of measurements of beacon signalling transmitted by the terminal device, wherein the measurements provide an indication of radio channel conditions associated with the first radio path and the second radio path.

In an embodiment, communications between the terminal device and at least one of the base stations are made via a relay node such that the corresponding radio path is a relayed radio path comprising a first relayed radio path element between the terminal device and the relay node and a second relayed radio path element between the relay node and the corresponding base station, and wherein the measurements of beacon signalling for the relayed radio path are measurements made by the relay node of radio channel conditions associated with the first relayed radio path element.

In an embodiment, the terminal device is configured to transmit the beacon signalling periodically.

In an embodiment, the terminal device is configured to have: a first mode in which neither of the first or second base stations acts as a serving base station and in which the time period between each periodic beacon signalling transmission is a first time period; and a second mode in which one of the first and second base stations acts as a serving base station and in which the time period between each periodic beacon signalling transmission is a second time period, the second time period being different to the first time period.

In an embodiment, when the controller element has selected the first base station to act as the serving base station for the terminal device, the controller element is configured to: determine, on the basis of further measurements of the beacon signalling transmitted by the terminal device, whether the second base station has become more suitable to act as the serving base station than the first base station; and if the second base station is determined to have become more suitable to act as the serving base station than the first base station, perform a handover operation select the second base station to act as the serving base station.

In an embodiment, each of the first base station and second base station are configured to use the same physical uplink radio channel and the same physical downlink radio channel to communicate with the terminal device when acting as the serving base station, wherein resources of the physical uplink radio channel and physical downlink radio channel are scheduled to the terminal device on the basis of a temporary identifier established for the terminal device; and when the controller performs the handover operation to select the second base station to act as the serving base station, the controller is configured to control the first base station to transfer the temporary identifier to the second base station.

According to a second aspect of the present disclosure, there is provided a terminal device for use in the wireless telecommunications system of the first aspect of the present disclosure.

According to a third aspect of the present disclosure, there is provided method of operating a wireless telecommunications system comprising a first base station, a second base station, and a terminal device operable to communicate with the first base station over a first radio path and to communicate with the second base station over a second radio path, the method comprising: selecting one of the first base station and the second base station to act as a serving base station for the terminal device on the basis of measurements of beacon signalling transmitted by the terminal device, wherein the measurements provide an indication of radio channel conditions associated with the first radio path and the second radio path.

According to a fourth aspect of the present disclosure, there is provided circuitry for operating a wireless telecommunications system comprising a first base station, a second base station, and a terminal device operable to communicate with the first base station over a first radio path and to communicate with the second base station over a second radio path, the circuitry being configured to: select one of the first base station and the second base station to act as a serving base station for the terminal device on the basis of measurements of beacon signalling transmitted by the terminal device, wherein the measurements provide an indication of radio channel conditions associated with the first radio path and the second radio path.

According to a fifth aspect of the present disclosure, there is provided a controller element for use in a wireless telecommunications system comprising a first base station and a second base station; and a terminal device operable to communicate with the first base station over a first radio path and to communicate with the second base station over a second radio path; wherein the controller element is configured to receive from the first and second base stations measurement reports indicating measurements of beacon signalling transmitted by the terminal device, wherein the measurements provide an indication of radio channel conditions associated with the first radio path and the second radio path, and select one of the first base station and the second base station to act as a serving base station for the terminal device on the basis of the measurement reports.

According to a sixth aspect of the present disclosure, there is provided a method of operating a controller element for use in a wireless telecommunications system comprising a first base station and a second base station; and a terminal device operable to communicate with the first base station over a first radio path and to communicate with the second base station over a second radio path; wherein the method comprises receiving from the first and second base stations measurement reports indicating measurements of beacon signalling transmitted by the terminal device, wherein the measurements provide an indication of radio channel conditions associated with the first radio path and the second radio path, and selecting one of the first base station and the second base station to act as a serving base station for the terminal device on the basis of the measurement reports.

According to a seventh aspect of the present disclosure, there is provided circuitry for a controller element for use in a wireless telecommunications system comprising a first base station and a second base station; and a terminal device operable to communicate with the first base station over a first radio path and to communicate with the second base station over a second radio path; wherein the circuitry is configured to control the controller element to receive from the first and second base stations measurement reports indicating measurements of beacon signalling transmitted by the terminal device, wherein the measurements provide an indication of radio channel conditions associated with the first radio path and the second radio path, and select one of the first base station and the second base station to act as a serving base station for the terminal device on the basis of the measurement reports.

According to an eighth aspect of the present disclosure, there is provided a first base station for use in a wireless telecommunications system comprising: the first base station, a controller element; a second base station; and a terminal device operable to communicate with the first base station over a first radio path and to communicate with the second base station over a second radio path; wherein the first base station is configured to make measurements of radio channel conditions associated with the first radio path and to communicate an indication of the measurements to the controller element.

In an embodiment, the first base station is further configured to receive control signalling from the controller element to configure the first base station to communicate with the terminal device over the first radio path.

According to a ninth aspect of the present disclosure, there is provided a method of operating a first base station in a wireless telecommunications system comprising the first base station, a controller element, a second base station and a terminal device operable to communicate with the first base station over a first radio path and to communicate with the second base station over a second radio path; wherein the method comprises making measurements of radio channel conditions associated with the first radio path and communicating an indication of the measurements to the controller element.

According to a tenth aspect of the present disclosure, there is provided circuitry for a first base station for use in a wireless telecommunications system comprising: the first base station, a controller element; a second base station; and a terminal device operable to communicate with the first base station over a first radio path and to communicate with the second base station over a second radio path; wherein the circuitry is configured to control the first base station to make measurements of radio channel conditions associated with the first radio path and to communicate an indication of the measurements to the controller element.

Various further aspects and features of the present disclosure are defined in the appended claims and include a communications device, a method of communicating using a communications device.

BRIEF DESCRIPTION OF DRAWINGS

Embodiments of the present disclosure will now be described by way of example only with reference to the accompanying drawings wherein like parts are provided with corresponding reference numerals and in which.

DESCRIPTION OF EXAMPLE EMBODIMENTS

Figure 1:
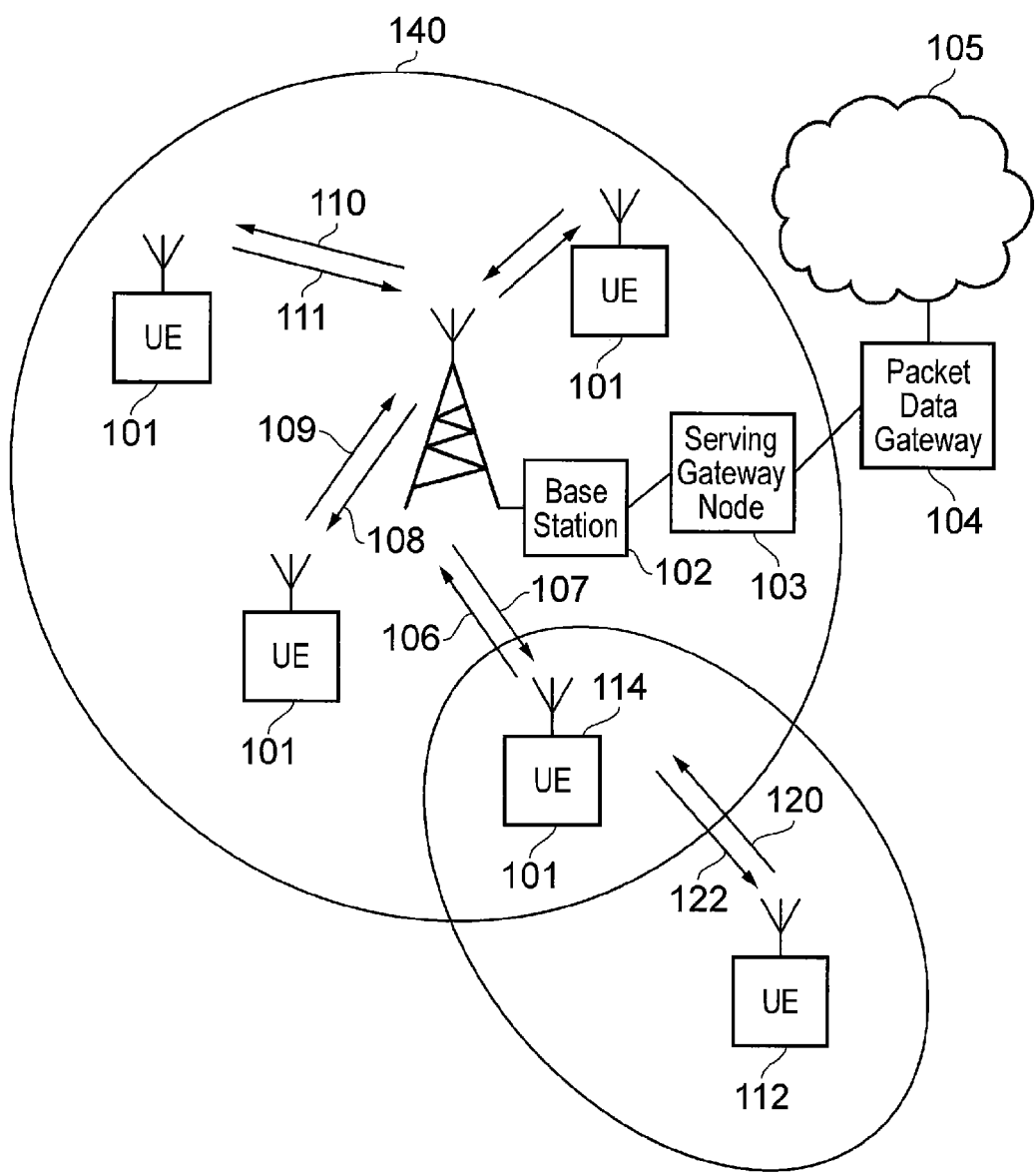
FIG. 1 provides a schematic diagram illustrating some basic functionality of a mobile telecommunications network/system which may be adapted to implement embodiments of the present disclosure.

FIG. 1 provides a schematic diagram illustrating some basic functionality of a wireless mobile telecommunications network/system 100 which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

FIG. 1 provides a schematic diagram of a conventional mobile telecommunications system 100, where the system includes mobile communications devices 101, infrastructure equipment 102, and a core network comprising a serving gateway node 103, a packet data gateway 104 which forms a gateway to an external network 105. The infrastructure equipment 102 may also be referred to as a base station, network element or a coordinating entity for example, and provides a wireless access interface to the one or more communications devices within a coverage area or cell. The one or more mobile communications devices may communicate data via the transmission and reception of signals representing data using the wireless access interface. The infrastructure equipment 102 is communicatively linked via the serving gateway node 103 and the packet data gateway 104 to the external network 105, which may be connected to one or more other communications systems or networks which have a similar structure to that formed from communications devices 101 and infrastructure equipment 102. The core network may also provide functionality including authentication, mobility management, charging and so on for the communications devices served by the network entity.

The mobile communications devices of FIG. 1 may also be referred to as communications terminals, user equipment (UE), terminal devices, mobile stations (MS), and so forth, and are configured to communicate with one or more other communications devices served by the same or a different coverage area via the network entity. These communications may be performed by transmitting and receiving signals representing data using the wireless access interface over the two way communications links represented by lines 106 to 111, where arrows 106, 108 and 110 represent downlink communications from the network entity to the communications devices and arrows 107, 109 and 111 represent the uplink communications from the communications devices to the infrastructure equipment 102.

Also shown in FIG. 1 is a line 140 which represents an indication of a maximum range within which radio signals can be communicated to and from the infrastructure equipment or base station 102. As will be appreciated the line 140 is just an illustration and in practice there will be a great variation in respect of the propagation conditions and therefore the range in which radio signals can be communicated to and from the base station 102. As shown in FIG. 1, in one example one of the communications devices 112 has moved to an area which is outside the line 140 representing a range within which radio signals can be communicated to and from the base station 102. The communications terminal 112 which is outside the range of the base station 102 may still communicate data to and from the base station 102 but this is achieved by relaying the data via one of the UE's 114 which acts as a relay node to the communications terminal 112.

Figure 2:
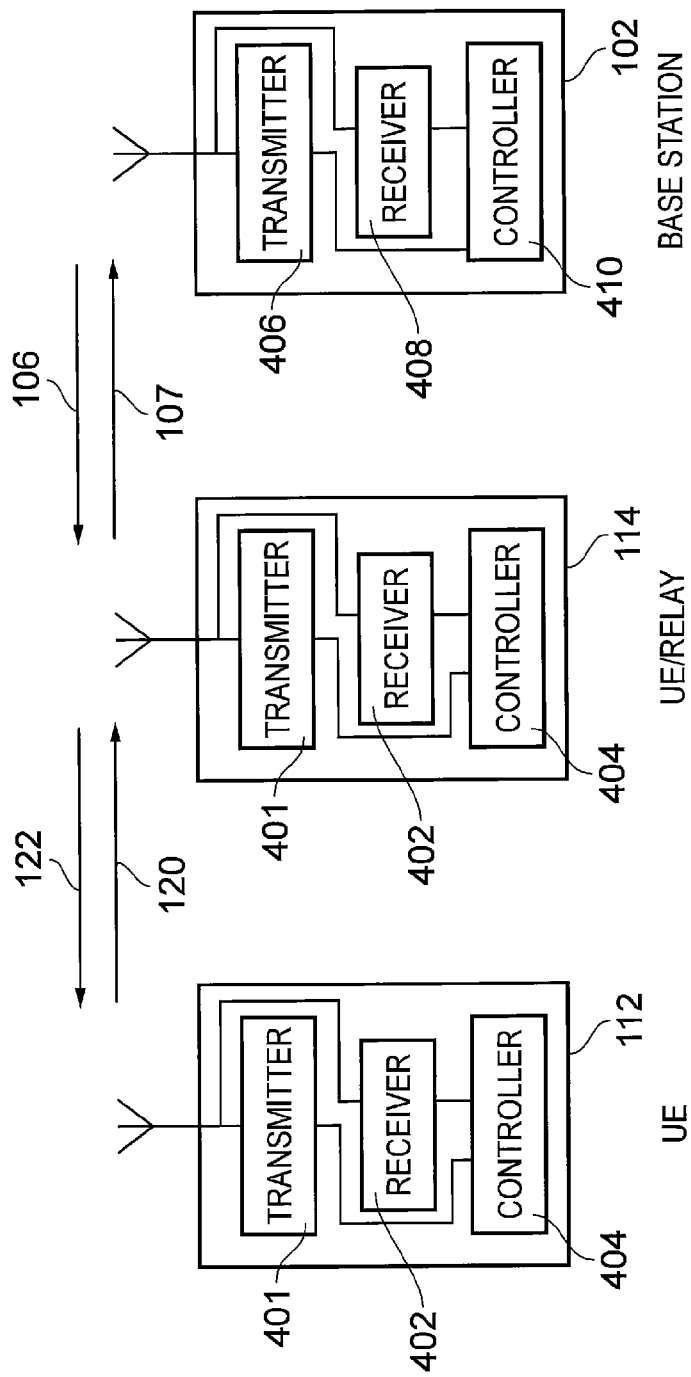
FIG. 2 provides a schematic block diagram of a communications path between an out-of-coverage UE and a base station via an in coverage UE acting as a relay node in the network/system of FIG. 1.

FIG. 2 shows a schematic block diagram of a communications path between the out-of-coverage UE 112 and the base station 102, via the in coverage UE acting as a relay node 114. As shown in FIG. 2 the out-of-coverage UE 112 includes a transmitter 401 a receiver 402 and a controller 404 to control the transmission and reception of signals to the in coverage UE 114 acting as a relay node. The up-link signals are represented by an arrow 120 which corresponds to that shown in FIG. 1 and the downlink signals are shown by an arrow 122, which corresponds to that shown in FIG. 1. The relay UE 114 could be a conventional UE and so includes also a transmitter 401 receiver 402 and a controller 404. The in coverage UE acting as a relay node 114 operates in accordance with a conventional arrangement but transmits signals on the uplink as shown by an arrow 107 and receives signals on the downlink as represented by an arrow 106 to and received from the base station 102 respectively. The base station 102 includes a transmitter 404 a receiver 408 and a controller 410 which may include a scheduler for scheduling the transmission and reception of signals on the downlink and the uplink in accordance with the wireless access interface used.

It is noted that, in embodiments of the present disclosure, each UE includes a transmitter, receiver and controller (as shown for UEs 112 and 114 in FIG. 2) and each base station includes a transmitter, receiver and controller (as shown for base station 102 in FIG. 2) so as to allow communication and signalling (including beacon signalling) between the UEs and/or base stations. In particular, each UE comprises a transmitter 401 for transmission of wireless signals, a receiver 402 for reception of wireless signals and a controller 404 configured to control the operation of the UE in accordance with embodiments of the disclosure. The controller may comprise a processor unit which is suitably configured/programmed to provide the desired functionality described herein using conventional programming/configuration techniques for equipment in wireless telecommunications systems. For each UE, the transmitter 401, receiver 402 and controller 404 are schematically shown in FIG. 2 as separate elements for ease of representation. However, it will be appreciated that for each UE the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the UEs 112, 114 will in general comprise various other elements associated with their operating functionality in accordance with established wireless telecommunications techniques (e.g. a power source, possibly a user interface, and so forth).

The telecommunications system of FIGS. 1 and 2 therefore allows a UE to communicate with the core network in different ways. For example, if the UE is within coverage of the base station 102 (as is the case with UEs 101 in FIG. 1, for example), then the UE can perform communication directly with the base station 102 so as to communicate with the core network. On the other hand, if the UE is not within coverage of the base station 102 (as is the case with UE 112 in FIG. 1, for example), then the UE can perform communication with the base station 102 via a further relay UE (UE 114 in FIG. 1, for example) so as to communicate with the core network. In this case, the base station 102 and relay UE 114 are examples of network nodes, network nodes being elements of the telecommunications system which perform communication with a UE so as to allow that UE to communicate with the core network.

Figure 3:
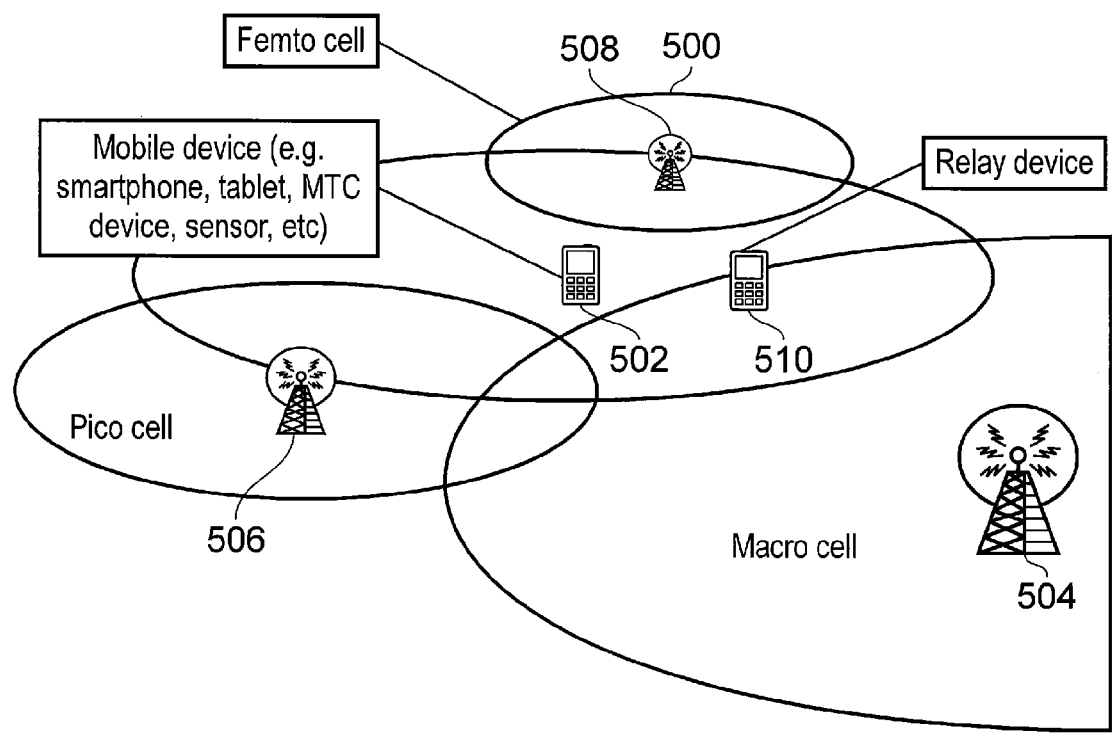
FIG. 3 provides a schematic diagram of a telecommunications system comprising several different types of network node which may be adapted to implement embodiments of the present disclosure.

FIG. 3 illustrates another example of a telecommunications system 500 comprising several network nodes, each of which is configured to perform communication with a UE 502 so as to allow the UE 502 to communicate with the core network. The network nodes include a macro cell base station 504, a pico cell base station 506, a femto cell base station 508 and a relay device 510. The macro cell, pico cell and femto cell base stations each have a corresponding structure to that of the base station 102 described with reference to FIGS. 1 and 2. Each of the macro cell, pico cell and femto cell base stations have a different extent of coverage (as determined by the power output and/or frequency range of each base station, for example), with the macro cell base station 504 having the largest coverage, followed by the pico cell base station 508, followed by the femto cell base station 508. Similarly, the relay device 510 has a corresponding structure to that of the relay UE 114 described with reference to FIGS. 1 and 2.

The UE 502 may communicate with the core network by performing communication with any one of the macro cell base station 504, pico cell base station 506, femto cell base station 508 and relay device 510. In the example of FIG. 3, the UE 502 is only within the coverage area of the relay device 510 (which, in turn, is within the coverage area of the macro cell base station 504), and therefore the UE 502 performs communication with the relay device 510 so as to communicate with the core network via the macro cell base station 504.

As discussed above, with conventional telecommunications systems, network node selection, reselection and handover are performed on the basis of measurements by a UE of downlink signals broadcast by each of the network nodes. The performance of such measurements (together with the measurement report signalling, handover signalling, reselection evaluation, etc.), however, results in high power consumption by the UE and requires the UE to comprise relatively complex and costly equipment for performing such measurements (which must be made over a range of different radio frequencies). This results in lower UE battery life, and also makes it difficult to design lower cost, simple UEs that are able to effectively communicate with the telecommunications network. In addition this comes at a cost of increased signalling load in the network, and increases the probability of handover failure particularly in the case of small cells and/or fast moving UEs.

The present disclosure aims to alleviate these problems by providing a telecommunications system in which, rather than the UE performing measurements on downlink signalling transmitted by the network nodes over a range of different frequencies (and then further handling the measurement reporting, handover signalling, reselection evaluation, etc. associated with these measurements), the UE instead transmits beacon signalling which can be measured by the nodes of the network. Each of the network nodes which receives the transmitted beacon signalling performs a measurement of the beacon signalling (the measurement at each network node providing an indication of radio channel conditions associated with the radio path between the UE and that network node), and the selection of an appropriate node is then determined by the network on the basis of these measurements. The UE therefore need only transmit the beacon signalling, whilst the processing load associated with signal measurement and node selection is passed to the network. Power consumption in the UE is therefore reduced, and the design of lower cost, simpler UEs is made easier. Furthermore, in a connected state, the need to perform handover signalling over the air is eliminated, or at least reduced, which decreases the probability of handover failure. Also, in an idle state (i.e. when there is no ongoing connection with the network), the network is able to track the location of the UE at a per-cell level, which eliminates the need to perform regular location/tracking area updates, and eliminates the need to page on multiple cells to reach the UE. This reduces the signalling load in the network particularly when a device is moving.

FIGS. 4A-D illustrate various embodiments of a telecommunications system according to the present disclosure. Please note that several features of the telecommunications system have been omitted from FIGS. 4A-D for the sake of clarity.

Figure 4A:
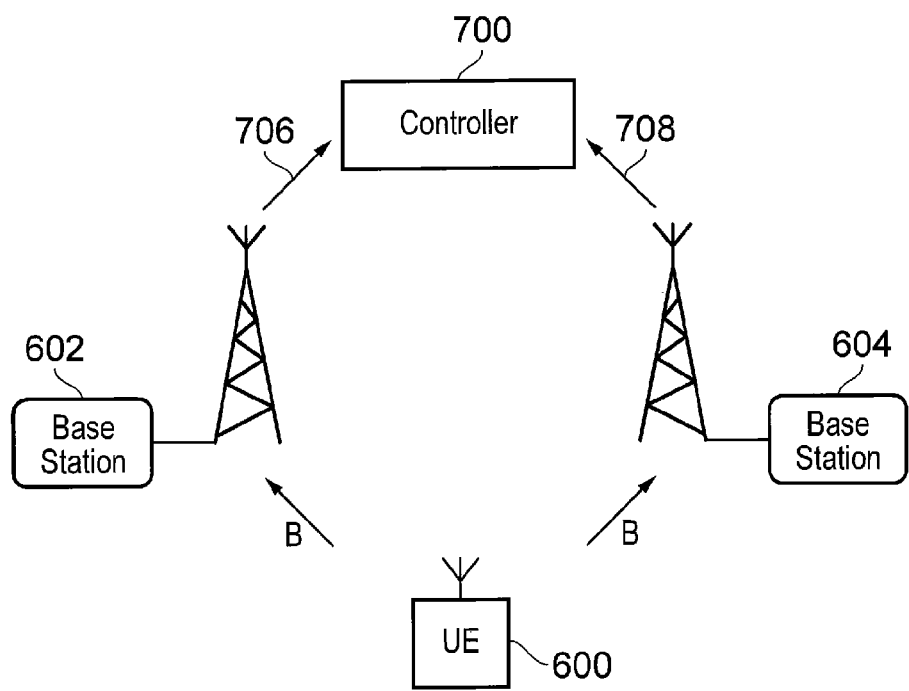
FIGS. 4A-D provide schematic diagrams of various embodiments of a telecommunications network/system according to the present disclosure.

FIG. 4A illustrates a first embodiment of a telecommunications system according to the present disclosure. In FIG. 4A, a UE 600 may connect to the core network via either a first base station 602 or a second base station 604. In this case, the first and second base stations are the network nodes available to the UE 600 to connect to the core network. The UE 600 is configured to communicate with the first base station over a first radio path and to communicate with the second base station over a second radio path. In order to connect to the core network, the UE 600 transmits beacon signalling B. The beacon signalling is received and measured at each of the first and second base stations. Measurement reports indicating the measurements of the beacon signalling at each of the first and second base stations 602, 604 are then transmitted to a controller 700 via communication paths 706, 708. On the basis of the beacon signalling measurements, the controller 700 controls either the first base station or second base station to perform communication with the UE 600 so as to allow the UE 600 to communicate with the core network.

Figure 4B:
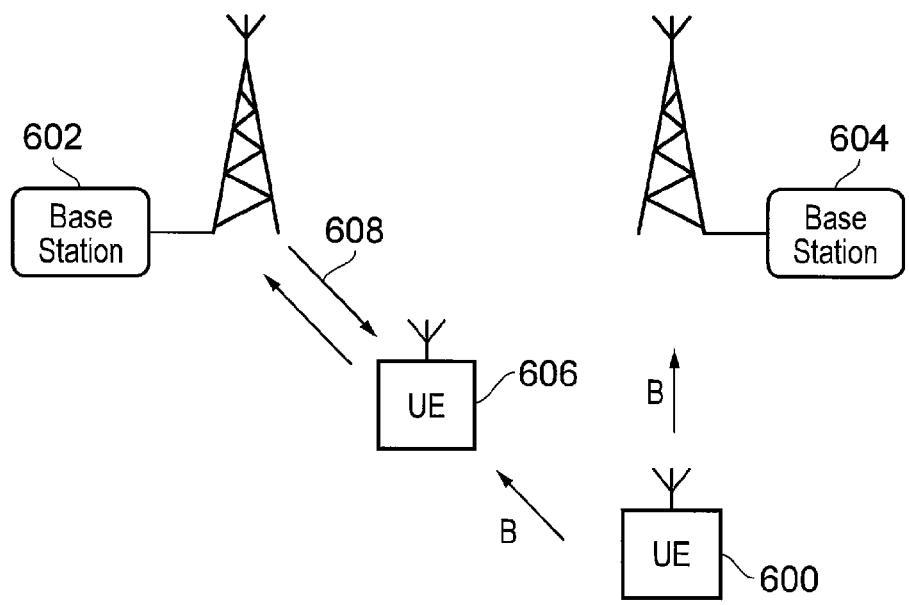

FIG. 4B illustrates a second embodiment of a telecommunications system according to the present disclosure. In FIG. 4B, the UE 600 may connect to the core network via either a relay UE 606, the relay UE 606 being in communication with the first base station 602 as indicated by uplink/downlink arrows 608, or a second base station 604. In this case, the relay UE 606 and the second base station are the network nodes available to the UE 600 to connect to the core network. The UE 600 is configured to communicate with the first base station 602 over a first radio path (the first radio path being a relayed radio path comprising a first relayed radio path element between the UE 600 and the relay UE 606 and a second relayed radio path element between the relay UE 606 and the first base station 602) and to communicate with the second base station 604 over a second radio path. In order to connect to the core network, the UE 600 transmits the beacon signalling B. The beacon signalling is received and measured at each of the relay UE 606 and the second base station 604. On the basis of the beacon signalling measurements, the controller (not shown in FIG. 4B, for simplicity) controls either the relay UE 606 or second base station 604 to perform communication with the UE 600 so as to allow the UE 600 to communicate with the core network.

Figure 4C:
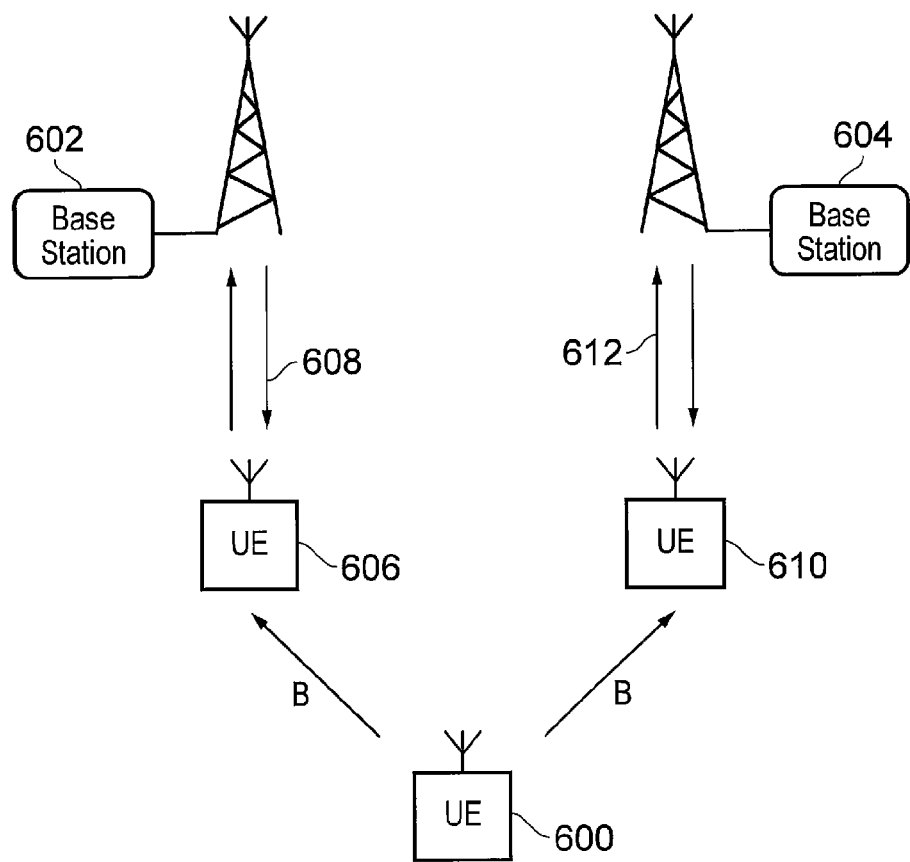

FIG. 4C illustrates a third embodiment of a telecommunications system according to the present disclosure. In FIG. 4C, the UE 600 may connect to the core network via either a first relay UE 606, the first relay UE 606 being in communication with the first base station 602 as indicated by uplink/downlink arrows 608, or a second relay UE 610, the second relay UE 610 being in communication with the second base station 604 as indicated by the uplink/downlink arrows 612. In this case, the first relay UE 606 and second relay UE 610 are the network nodes available to the UE 600 to connect to the core network. The UE 600 is configured to communicate with the first base station 602 over a first radio path (the first radio path being a relayed radio path comprising a first relayed radio path element between the UE 600 and the relay UE 606 and a second relayed radio path element between the relay UE 606 and the first base station 602) and to communicate with the second base station 604 over a second radio path (the second radio path being a relayed radio path comprising a first relayed radio path element between the UE 600 and the relay UE 610 and a second relayed radio path element between the relay UE 610 and the second base station 604). In order to connect to the core network, the UE 600 transmits the beacon signalling B. The beacon signalling is received and measured at each of the relay UE 606 and the relay UE 610. On the basis of the beacon signalling measurements, the controller (not shown in FIG. 4C, for simplicity) controls either the first relay UE 606 or second relay UE 610 to perform communication with the UE 600 so as to allow the UE 600 to communicate with the core network.

Figure 4D:
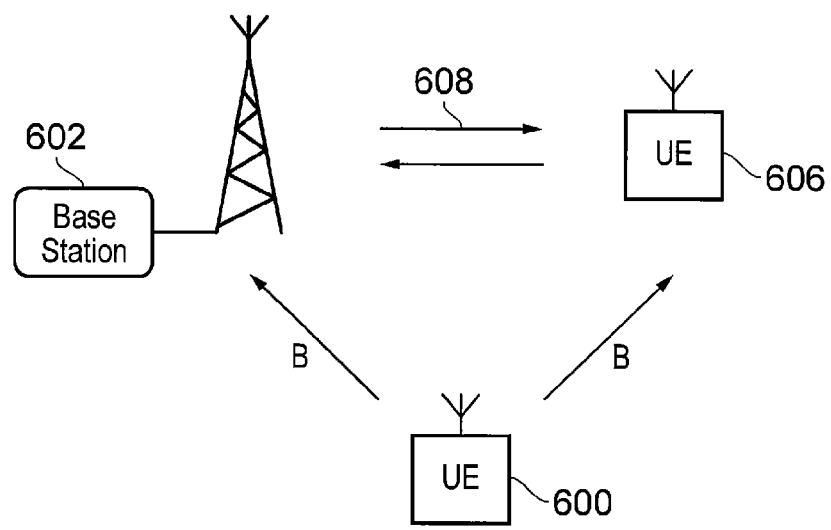

FIG. 4D illustrates a fourth embodiment of a telecommunications system according to the present disclosure. In FIG. 4D, the UE 600 may connect to the core network via either a base station 602 or a relay UE 606, the relay UE 606 being in communication with the base station 602 as indicated by uplink/downlink arrows 608. In this case, the base station 602 and the relay UE 606 are the network nodes available to the UE 600 to connect to the core network. The UE 600 is configured to communicate with the base station 602 over a first radio path (the first radio path being a direct radio path between the UE 600 and base station 602) or over a second radio path (the second radio path being a relayed radio path comprising a first relayed radio path element between the UE 600 and the relay UE 606 and a second relayed radio path element between the relay UE 606 and the base station 602). In order to connect to the core network, the UE 600 transmits the beacon signalling B. The beacon signalling is received and measured at each of the base station 602 and the relay UE 606. On the basis of the beacon signalling measurements, the controller (not shown in FIG. 4D, for simplicity) controls either the base station 602 or relay UE 606 to perform communication with the UE 600 so as to allow the UE 600 to communicate with the core network. In some respects this embodiment of the disclosure is similar to that schematically shown in FIG. 4B, but with the first base station 602 and the second base station 604 being the same base station.

The controller (or controller element) 700 selects which one of the network nodes is to perform communication with the UE 600 so as to allow the UE 600 to communicate with the core network on the basis of the measurements of the beacon signalling B made by each of the network nodes positioned so as to receive the beacon signalling B. The selected network node may be referred to as the serving node. Thus, the controller receives a measurement report indicating the measurement of the beacon signalling B from each node at which the beacon signalling B is received and measured, and determines the serving node on the basis of these measurements. The network node which is determined to be the serving node then establishes communication with the UE 600 on the basis of control signalling transmitted to the selected serving node from the controller 700.

The controller may be comprised within any suitable element of the telecommunications network which is able to establish a communication path with the network nodes for the transmission of beacon signalling measurement reports and the transmission of control signalling. For example, the controller may be comprised as part of a base station or as part of the core network.

Any suitable characteristic of the beacon signalling B which is indicative of the radio channel conditions associated with the radio path between the UE 600 and each respective network node may be measured by the network nodes and reported to the controller. For example, the measured characteristic may be the signal strength or quality of the beacon signalling, and the controller may control the node which measures the highest signal strength or quality of the beacon signalling to be the serving node. As a more specific example, the signal strength or quality of a known sequence of reference symbols of the beacon signalling could be the measured characteristic. Furthermore, the controller may also take other information into account in the selection of the serving node, such as the downlink coverage of the network node (for example, even if a network node measures the highest signal strength from the mobile device, the cell may not be suitable due to the overall path loss between the device and the network node), the load at each node or Quality of Service (QoS) requirements.

It is noted that each of the first base station 602 and second base station 604 may be any suitable kind of base station, including a macro cell base station, pico cell base station or femto cell base station, for example.

Figure 5:
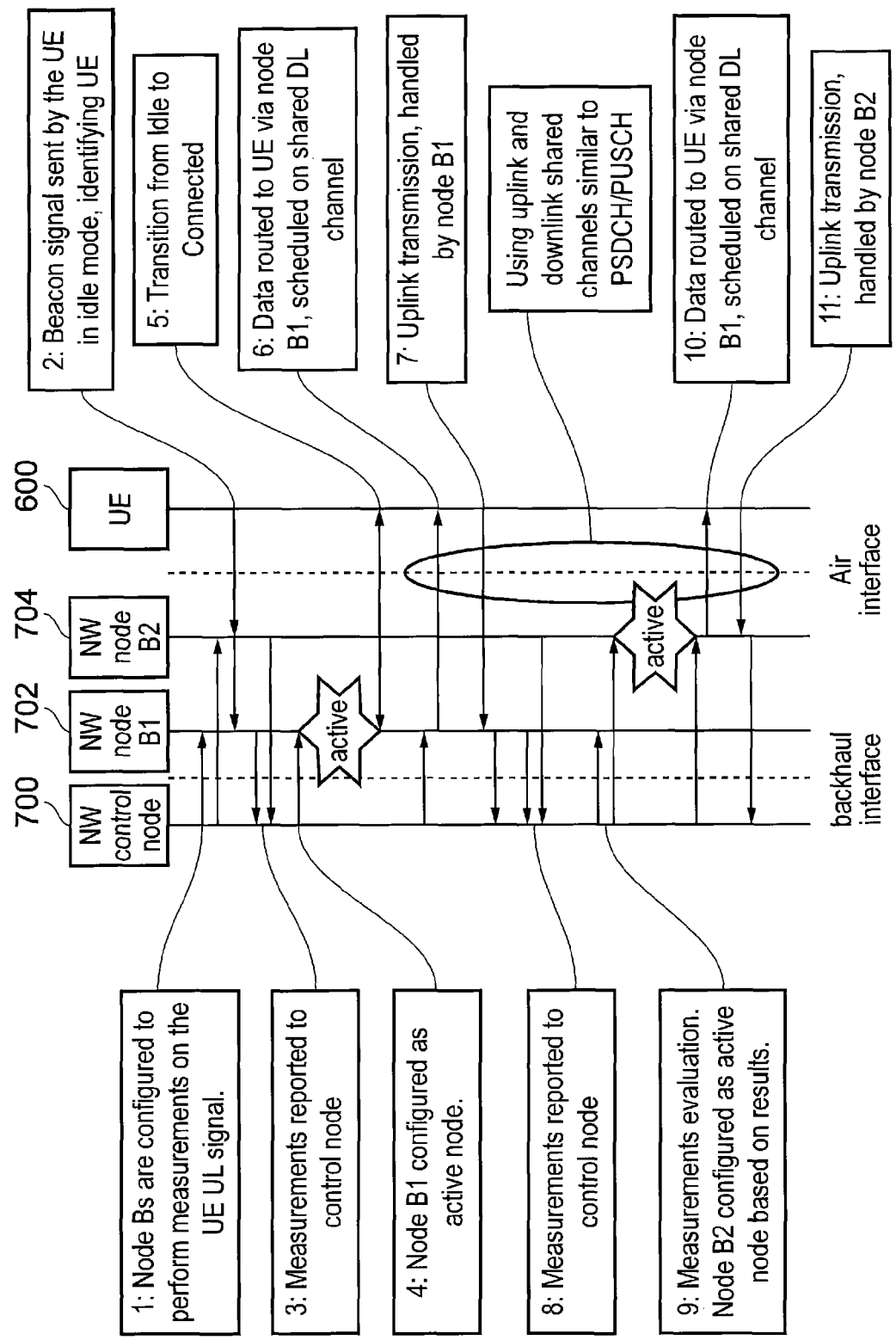
FIG. 5 provides a schematic diagram of a process by which an active network node is selected in a telecommunications network/system according to embodiments of the present disclosure.

A process by which serving nodes are selected and reselected according to an embodiment of the present disclosure is illustrated in FIG. 5.

In FIG. 5, signalling is performed between a controller 700, a first network node 702, a second network node 704 and a UE 600. The controller 700 is a controller for selecting one of the first and second network nodes 702, 704 as a serving node for performing communication with the UE 600 (as described above). Each of the first and second network nodes 702, 704 may be, for example, a base station or relay node as described with reference to FIGS. 4A-D. It will be appreciated that if at least one of the first and second network nodes 702, 704 is a relay node, then signalling between the relay node and the controller 700 will occur via the respective base station with which the relay node performs communication.

In step 1, the controller 700 configures the first and second network nodes 702, 704 to perform measurements of the beacon signalling transmitted by the UE 600. In step 2, the UE 600, which is currently in a first, idle mode in which it does not perform communication with any network node, transmits beacon signalling. In step 3, the beacon signalling transmitted by the UE 600 is measured by each of the network nodes 702, 704 and the measurements are reported to the controller 700. On the basis of these measurements, in step 4, the controller then configures the first network node 702 to be the serving node (or active node). The first network node 702 may be selected as the active node by the controller 700 because a measurement of the signal quality of the beacon signalling is higher at the first network node 702 than at the second network node 704, for example.

At step 5, communication is established between the UE 600 and the first network node 702 and the UE 600 transitions to a second, connected mode. In order to establish this communication, a temporary identifier for addressing the UE 600 is established by a suitable element of the network (such as the controller 700 or the first network node 702).

This temporary identifier allows resources scheduled to the UE 600 in the uplink/downlink physical radio channels to be identified by the UE and/or network node (the temporary identifier therefore being similar to the Radio Network Temporary Identifier (RNTI) used in existing Long Term Evolution (LTE) networks, for example). In steps 6 and 7, uplink and downlink communication is performed between the UE 600 and the first network node 702. This may occur over uplink and downlink channels which are shared between different network nodes, as described in more detail below.

In the second, connected mode, the UE 600 continues to transmit beacon signalling so as to allow further measurement of the beacon signalling by each of the network nodes 702, 704 and monitoring of the beacon signalling measurements by the controller 700. The reporting of the beacon signal measurements to the controller 700 by each of the first and second network nodes 702, 704 is shown in step 8.

On the basis of these measurements, in step 9, the controller 700 determines whether the first network node 702 is still the most suitable serving node or whether the second network node 704 would now be a more suitable serving node. This may include, for example, comparing the measurement of the beacon signalling at each of the first and second network nodes, and determining the network node with the most favourable measurement (for example, the network node with the highest signal quality measurement of the beacon signalling) as the most suitable serving node.

If the most suitable serving node is not the current serving node, then the controller 700 performs a handover operation from the current serving node to the newly determined most suitable serving node. In the example of FIG. 5, the second network node 704 is determined to be the most suitable serving node in step 9, and therefore the controller 700 controller deactivates the first network node 702 as the current serving node and activates the second network node 704 to become the serving node (or active node). It is noted that the most suitable network node may change from being the first network node 702 to the second network node 704 if, for example, the UE 600 moves away from the first network node 702 and towards the second network node 704, for example. In steps 10 and 11, uplink and downlink communication is performed between the UE 600 and the second network node 704 over the shared uplink and downlink channels.

Thus, it can be seen from FIG. 5 that, advantageously, an initial connection may be established between a UE 600 and a network node on the basis of beacon signalling from the UE 600, and furthermore, the network node which performs communication with the UE 600 may be changed on the basis of beacon signalling from the UE 600. A reliable connection between the UE 600 and the network can therefore be established and maintained on the basis of the beacon signalling from the UE 600. The UE 600 therefore does not need to perform the downlink signal measurements of conventional telecommunications systems, thus reducing power consumption at the UE 600 and allowing the UE 600 to have a simpler, lower cost design, and reducing the control signalling overhead thus improving handover reliability and network capacity.

The beacon signal transmitted by the UE 600 is an uplink signal which may be, for example, transmitted on a shared physical channel. The beacon signal has a characteristic (such as signal strength or signal quality of a known sequence of reference symbols, for example) which is measurable by each network node and which is indicative of radio channel conditions associated with the radio path between the UE 600 and each network node. The beacon signal also allows the UE 600 to be uniquely identified by the network (for example, the beacon signal transmitted by the UE 600 may comprise an identifier which uniquely identifies the UE 600 over other UEs). In one embodiment, the beacon signal is transmitted over a shared physical channel over a single predetermined carrier frequency. Advantageously, this allows the hardware and/or software resources in the UE which implement the beacon signalling to be simple in design (and therefore reliable and low cost) and to have low power consumption.

In an embodiment, the beacon signalling transmitted by the UE 600 is transmitted periodically so as to reduce power consumption at the UE. Furthermore, when the UE is in the idle mode (as is the case when the UE does not perform communication with any network node), the time period between each periodic beacon signalling transmission may be a first time period, and when the UE is in the connected mode (as is the case when the UE does perform communication with a network node), the time period between each periodic beacon signalling transmission may be a second time period, the second time period being different to the first time period. In one embodiment, the second time period may be shorter than the first time period so as to provide periodic beacon signalling which is less frequent in the idle mode (thus allowing further reduced power consumption whilst still providing beacon signalling sufficient to allow connection of the UE with the core network) and more frequent in the connected mode (thus allowing a reliable connection of the UE with the core network to be maintained). As a further power saving measure, the power of the transmitted beacon signalling may be reduced once the UE is connected with a network node in the connected mode, for example based on power control feedback.

As described above, the controller 700 performs initial selection of the serving node on the basis of the beacon signal measurements reported by each network node and also controls subsequent handover between network nodes on the basis of these beacon signal measurements. The controller 700 may also take into account other factors when selecting the most suitable serving node (either as an initial network node selection or when performing handover between network nodes), such as downlink coverage of the network node (for example, even if a network node measures the highest signal strength from the mobile device, the cell may not be suitable due to the overall path loss between the device and the network node), the load at each network node or Quality of Service (QoS) requirements (as mentioned above). When a serving node has been selected by the controller 700, the selected node must perform synchronisation and uplink/downlink scheduling with the UE 600 so as to allow communication with the UE 600.

The synchronisation may be performed by, for example, either the selected node adjusting its downlink timing according to the timing of the UE (as determined by the uplink beacon signalling from the UE) or by the selected node sending a downlink synchronisation signal to the UE so that the UE can adjust its timing.

The uplink/downlink scheduling is carried out on the basis of the temporary identifier established for addressing the UE 600 when it first connects to the network. Advantageously, in the telecommunications system of the present disclosure, the same physical downlink and uplink channels may be shared by different network nodes. Thus, when the controller 700, on the basis of the beacon signal measurements reported by the network nodes, selects a new serving node, handover from the current serving node to the new serving node simply requires the temporary identifier of the UE 600 to be transferred from the current serving node to the new serving node via an appropriate backhaul interface. Scheduling of resources on the shared physical uplink/downlink channels then continues on the basis of the temporary identifier of the UE 600 as before, and the UE 600 need not perform any further operations so as to allow the handover to be completed other than timing synchronisation with the new serving node. In an embodiment, in order to help avoid interference in the case of shared physical uplink/downlink channels, the controller 700 and/or the network nodes may use resource mapping (similar to that used in LTE, for example) so as to ensure that the same resource element in the shared physical uplink/down channels is not used by more than one network node at any one time.

Thus, with the present technique, conventional downlink signal measurement and handover or reselection processing associated with the UE 600 is avoided, removing the need for the UE 600 to include appropriate hardware and/or software for performing conventional downlink signal measurement and handover or reselection. This allows the UE 600 to be of a simpler design and the power consumption of the UE 600 to be reduced. Furthermore, by avoiding the need for conventional handover processing (including handover preparation signalling, etc.) during handover, the handover time is reduced compared to that of conventional networks. This is particularly advantageous with, for example, networks with many nodes each with a small coverage area (for example, a network with many pico cells or femto cells) in which handover occurs often, since it helps provide rapid handover with a low handover failure rate. This further reduces the overall control signalling load in the network, since in connected mode the signalling associated with handover is eliminated or at least reduced, and in idle mode the signalling associated with location/tracking area and with paging can be reduced.

The backhaul interface (not shown) between nodes (over which the temporary identifier of the UE 600 is transferred during handover) may be a wired interface (for handover between base stations such as shown in FIG. 4A, for example) or a wireless interface (for handover between a relay node and a base station with which that relay node is performing communication such as shown in FIG. 4D, for example). The backhaul interface may also comprise both a wired and wireless interface (for handover between a relay node and a base station with which that relay node is not performing communication such as shown in FIG. 4B, for example).

In an embodiment of the present disclosure, there is provided a wireless telecommunications system comprising: a first terminal device configured to transmit beacon signalling; a first base station configured to measure a characteristic of the beacon signalling transmitted by the first terminal device; at least one of: (a) one or more second base stations each configured to measure the characteristic of the beacon signalling transmitted by the first terminal device and (b) one or more second terminal devices each configured to perform communication with a different, respective one of the first and second base stations and to measure the characteristic of the beacon signalling transmitted by the first terminal device; and a controller element configured to, on the basis of the measurements of each of the first base station, one or more second base stations and one or more second terminal devices, select either the first base station to perform communication with the first terminal device, one of the second base stations to perform communication with the first terminal device, or one of the second terminal devices to act as a relay node to allow communication between the first terminal device and the first or second base station with which that second terminal device is configured to perform communication.

Thus, there has been described a wireless telecommunications system comprising: a controller element; a first base station and a second base station; and a terminal device operable to communicate with the first base station over a first radio path and to communicate with the second base station over a second radio path, the second radio path being different to the first radio path. The controller element is configured to select one of the first base station and the second base station to act as a serving base station for the terminal device (i.e. in effect, selecting one of the first radio path and the second radio path) on the basis of measurement reports received from the base stations indicating measurements of beacon signalling transmitted by the terminal device, wherein the measurements provide an indication of radio channel conditions associated with the first radio path and the second radio path.

Respective features of the present disclosure are defined by the following numbered paragraphs:

Paragraph 1. A wireless telecommunications system comprising:
  a controller element;
  a first base station and a second base station; and
  a terminal device operable to communicate with the first base station over a first radio path and to communicate with the second base station over a second radio path;
  wherein the controller element is configured to select one of the first base station and the second base station to act as a serving base station for the terminal device on the basis of measurements of beacon signalling transmitted by the terminal device, wherein the measurements provide an indication of radio channel conditions associated with the first radio path and the second radio path.

Paragraph 2. The wireless telecommunications system of Paragraph 1, wherein communications between the terminal device and at least one of the base stations are made via a relay node such that the corresponding radio path is a relayed radio path comprising a first relayed radio path element between the terminal device and the relay node and a second relayed radio path element between the relay node and the corresponding base station, and wherein the measurements of beacon signalling for the relayed radio path are measurements made by the relay node of radio channel conditions associated with the first relayed radio path element.

Paragraph 3. A wireless telecommunications system according to any preceding Paragraph, wherein the terminal device is configured to transmit the beacon signalling periodically.

Paragraph 4. A wireless telecommunications system according to Paragraph 3, wherein the terminal device is configured to have:
  a first mode in which neither of the first or second base stations acts as a serving base station and in which the time period between each periodic beacon signalling transmission is a first time period; and
  a second mode in which one of the first and second base stations acts as a serving base station and in which the time period between each periodic beacon signalling transmission is a second time period, the second time period being different to the first time period.

Paragraph 5. A wireless telecommunications system according to any preceding Paragraph, wherein:
when the controller element has selected the first base station to act as the serving base station for the terminal device, the controller element is configured to:
determine, on the basis of further measurements of the beacon signalling transmitted by the terminal device, whether the second base station has become more suitable to act as the serving base station than the first base station; and
if the second base station is determined to have become more suitable to act as the serving base station than the first base station, perform a handover operation select the second base station to act as the serving base station.

Paragraph 6. A wireless telecommunications system according to Paragraph 5, wherein:
each of the first base station and second base station are configured to use the same physical uplink radio channel and the same physical downlink radio channel to communicate with the terminal device when acting as the serving base station, wherein resources of the physical uplink radio channel and physical downlink radio channel are scheduled to the terminal device on the basis of a temporary identifier established for the terminal device; and
when the controller performs the handover operation to select the second base station to act as the serving base station, the controller is configured to control the first base station to transfer the temporary identifier to the second base station.

Paragraph 7. A terminal device for use in the wireless telecommunications system of Paragraph 1.

Paragraph 8. A method of operating a wireless telecommunications system comprising a first base station, a second base station, and a terminal device operable to communicate with the first base station over a first radio path and to communicate with the second base station over a second radio path, the method comprising:
selecting one of the first base station and the second base station to act as a serving base station for the terminal device on the basis of measurements of beacon signalling transmitted by the terminal device, wherein the measurements provide an indication of radio channel conditions associated with the first radio path and the second radio path.

Paragraph 9. Circuitry for operating a wireless telecommunications system comprising a first base station, a second base station, and a terminal device operable to communicate with the first base station over a first radio path and to communicate with the second base station over a second radio path, the circuitry being configured to:
select one of the first base station and the second base station to act as a serving base station for the terminal device on the basis of measurements of beacon signalling transmitted by the terminal device, wherein the measurements provide an indication of radio channel conditions associated with the first radio path and the second radio path.

Paragraph 10. A controller element for use in a wireless telecommunications system comprising a first base station and a second base station; and a terminal device operable to communicate with the first base station over a first radio path and to communicate with the second base station over a second radio path; wherein the controller element is configured to receive from the first and second base stations measurement reports indicating measurements of beacon signalling transmitted by the terminal device, wherein the measurements provide an indication of radio channel conditions associated with the first radio path and the second radio path, and select one of the first base station and the second base station to act as a serving base station for the terminal device on the basis of the measurement reports.

Paragraph 11. A method of operating a controller element for use in a wireless telecommunications system comprising a first base station and a second base station; and a terminal device operable to communicate with the first base station over a first radio path and to communicate with the second base station over a second radio path; wherein the method comprises receiving from the first and second base stations measurement reports indicating measurements of beacon signalling transmitted by the terminal device, wherein the measurements provide an indication of radio channel conditions associated with the first radio path and the second radio path, and selecting one of the first base station and the second base station to act as a serving base station for the terminal device on the basis of the measurement reports.

Paragraph 12. Circuitry for a controller element for use in a wireless telecommunications system comprising a first base station and a second base station; and a terminal device operable to communicate with the first base station over a first radio path and to communicate with the second base station over a second radio path; wherein the circuitry is configured to control the controller element to receive from the first and second base stations measurement reports indicating measurements of beacon signalling transmitted by the terminal device, wherein the measurements provide an indication of radio channel conditions associated with the first radio path and the second radio path, and select one of the first base station and the second base station to act as a serving base station for the terminal device on the basis of the measurement reports.

Paragraph 13. A first base station for use in a wireless telecommunications system comprising: the first base station, a controller element; a second base station; and a terminal device operable to communicate with the first base station over a first radio path and to communicate with the second base station over a second radio path; wherein the first base station is configured to make measurements of radio channel conditions associated with the first radio path and to communicate an indication of the measurements to the controller element.

Paragraph 14. A first base station according to Paragraph 13, wherein the first base station is further configured to receive control signalling from the controller element to configure the first base station to communicate with the terminal device over the first radio path.

Paragraph 15. A method of operating a first base station in a wireless telecommunications system comprising the first base station, a controller element, a second base station and a terminal device operable to communicate with the first base station over a first radio path and to communicate with the second base station over a second radio path; wherein the method comprises making measurements of radio channel conditions associated with the first radio path and communicating an indication of the measurements to the controller element.

Paragraph 16. Circuitry for a first base station for use in a wireless telecommunications system comprising: the first base station, a controller element; a second base station; and a terminal device operable to communicate with the first base station over a first radio path and to communicate with the second base station over a second radio path; wherein the circuitry is configured to control the first base station to make measurements of radio channel conditions associated with the first radio path and to communicate an indication of the measurements to the controller element.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

REFERENCES

[1] Holma H. and Toskala A, "LTE for UMTS OFDMA and SC-FDMA based radio access", John Wiley and Sons, 2009

The invention claimed is:

1. A wireless telecommunications system comprising:
a controller element;
a first base station and a second base station; and
a terminal device operable to communicate with the first base station over a first radio path and to communicate with the second base station over a second radio path;
wherein the controller element is configured to select one of the first base station and the second base station to act as a serving base station for the terminal device on the basis of measurements of beacon signalling transmitted by the terminal device, wherein the measurements provide an indication of radio channel conditions associated with the first radio path and the second radio path,
wherein communications between the terminal device and at least one of the base stations are made via a relay node such that the corresponding radio path is a relayed radio path comprising a first relayed radio path element between the terminal device and the relay node and a second relayed radio path element between the relay node and the corresponding base station, and wherein the measurements of beacon signalling for the relayed radio path are measurements made by the relay node of radio channel conditions associated with the first relayed radio path element,
wherein the terminal device is configured to have:
a first mode which is an idle mode during which the terminal device does not perform communication with any base station and in which neither of the first or second base stations acts as a serving base station and in which the time period between each periodic beacon signalling transmission is a first time period; and
a second mode which is connected mode in which one of the first and second base stations acts as a serving base station and in which the time period between each periodic beacon signalling transmission is a second time period, the second time period being shorter than the first time period.

2. The wireless telecommunications system according to claim 1, wherein the terminal device is configured to transmit the beacon signalling periodically.

3. The wireless telecommunications system according to claim 1, wherein:

when the controller element has selected the first base station to act as the serving base station for the terminal device, the controller element is configured to:
determine, on the basis of further measurements of the beacon signalling transmitted by the terminal device, whether the second base station has become more suitable to act as the serving base station than the first base station; and
if the second base station is determined to have become more suitable to act as the serving base station than the first base station, perform a handover operation select the second base station to act as the serving base station.

4. The wireless telecommunications system according to claim 3, wherein:
each of the first base station and second base station are configured to use the same physical uplink radio channel and the same physical downlink radio channel to communicate with the terminal device when acting as the serving base station, wherein resources of the physical uplink radio channel and physical downlink radio channel are scheduled to the terminal device on the basis of a temporary identifier established for the terminal device; and
when the controller performs the handover operation to select the second base station to act as the serving base station, the controller is configured to control the first base station to transfer the temporary identifier to the second base station.

5. The wireless telecommunications system according to claim 3, wherein when the controller performs the handover operation to select the second base station to act as the serving base station, the second base station is configured to perform synchronization with the terminal device by adjusting its downlink timing according to the timing of the terminal device.

6. The wireless telecommunications system according to claim 1, wherein:
the relay node is another terminal device.

7. The wireless telecommunications system according to claim 1, wherein the terminal device is configured to reduce the power of the transmitted beacon signalling when the UE is in connected mode.

8. Circuitry for operating a wireless telecommunications system comprising a first base station, a second base station, a relay node, and a terminal device operable to communicate with the first base station over a first radio path and to communicate with the second base station over a second radio path, the circuitry being configured to:
select one of the first base station and the second base station to act as a serving base station for the terminal device on the basis of measurements of beacon signalling transmitted by the terminal device, wherein the measurements provide an indication of radio channel conditions associated with the first radio path and the second radio path,
wherein communications between the terminal device and at least one of the base stations are made via the relay node such that the corresponding radio path is a relayed radio path comprising a first relayed radio path element between the terminal device and the relay node and a second relayed radio path element between the relay node and the corresponding base station, and wherein the measurements of beacon signalling for the relayed radio path are measurements made by the relay node of radio channel conditions associated with the first relayed radio path element, wherein the terminal device is configured to have:
a first mode which is an idle mode during which the terminal device does not perform communication with any base station and in which neither of the first or second base stations acts as a serving base station and in which the time period between each periodic beacon signalling transmission is a first time period; and
a second mode which is connected mode in which one of the first and second base stations acts as a serving base station and in which the time period between each periodic beacon signalling transmission is a second time period, the second time period being shorter than the first time period.

9. The circuitry according to claim 8, wherein:
the relay node is another terminal device.

10. A controller element for use in a wireless telecommunications system comprising a first base station, a second base station, a node and a terminal device operable to communicate with the first base station over a first radio path and to communicate with the second base station over a second radio path,
wherein the controller element is configured to receive from the first and second base stations measurement reports indicating measurements of beacon signalling transmitted by the terminal device, wherein the measurements provide an indication of radio channel conditions associated with the first radio path and the second radio path, and select one of the first base station and the second base station to act as a serving base station for the terminal device on the basis of the measurement reports, wherein communications between the terminal device and at least one of the base stations are made via the relay node such that the corresponding radio path is a relayed radio path comprising a first relayed radio path element between the terminal device and the relay node and a second relayed radio path element between the relay node and the corresponding base station, and wherein the measurements of beacon signalling for the relayed radio path are measurements made by the relay node of radio channel conditions associated with the first relayed radio path element, wherein the terminal device is configured to have:

a first mode which is an idle mode during which the terminal device does not perform communication with any base station and in which neither of the first or second base stations acts as a serving base station and in which the time period between each periodic beacon signalling transmission is a first time period; and a second mode which is connected mode in which one of the first and second base stations acts as a serving base station and in which the time period between each periodic beacon signalling transmission is a second time period, the second time period being shorter than the first time period.

11. The controller element according to claim 10, wherein:
the relay node is another terminal device.

* * * * *